W. H. GRAY.
Grafting Implement.
No. 210,420.  Patented Dec. 3, 1878.
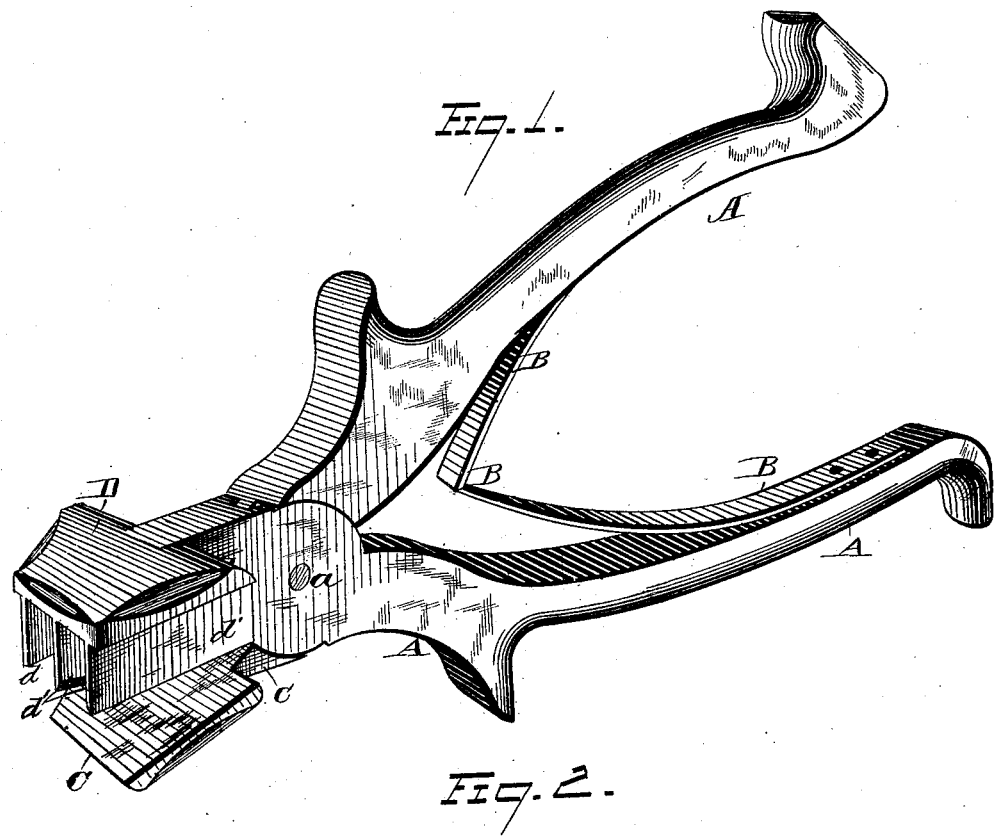
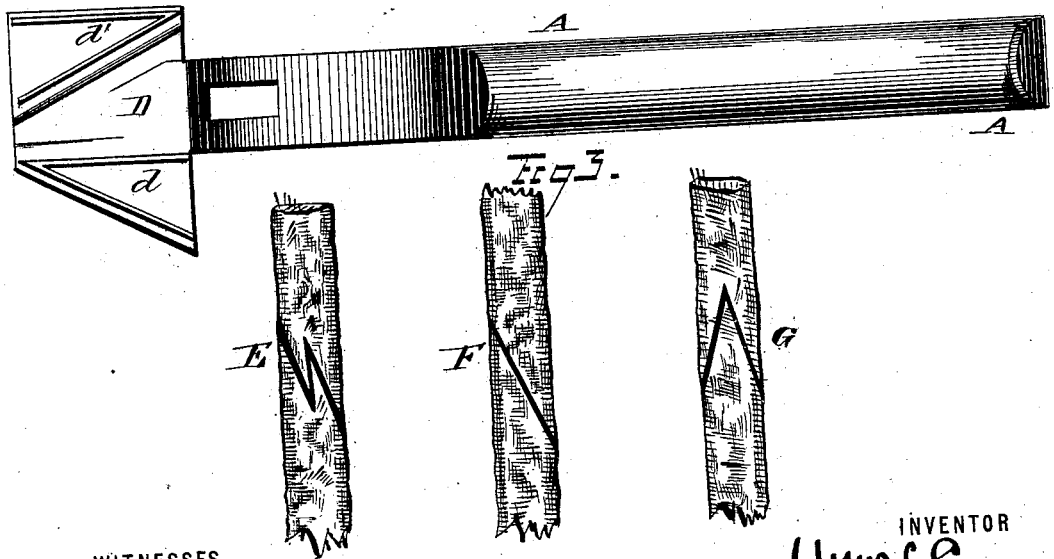

UNITED STATES PATENT OFFICE.

WILLIAM H. GRAY, OF TAMA CITY, IOWA.

IMPROVEMENT IN GRAFTING IMPLEMENTS.

Specification forming part of Letters Patent No. 210,420, dated December 3, 1878; application filed October 30, 1878.

*To all whom it may concern:*

Be it known that I, WILLIAM H. GRAY, of Tama City, in the county of Tama and State of Iowa, have invented certain new and useful Improvements in Grafting Implements; and I do hereby declare the following to be a full, clear, and exact description of the invention, such as will enable others skilled in the art to which it pertains to make and use it, reference being had to the accompanying drawings, which form part of this specification.

My invention relates to grafting implements, and is designed to provide an instrument adapted to readily and easily make the desired form of cut required in both the scion and the stock.

Heretofore different-shaped blades have been used in grafting-machines, the same being both straight and angular; but no form of shears has as yet been made adapted to accomplish the work required in grafting.

My invention provides such an adaptation of parts, and thus permits the work of grafting to be quickly and easily accomplished, by reason of the advantage incident to such form of instrument.

It consists in the combination, with a pair of pivoted handles provided with a spring or springs tending to force the same apart, of a flat bearing-blade and a cutting-blade, said cutting-blade being made with an angular-shaped knife or knives of the desired form and in the same piece therewith.

The shears are made of malleable iron, and have the knife or knives cast in or otherwise secured in the same piece with the blade to which the same are secured, the blades being properly subjected to a tempering treatment, so as to make them of the best razor-steel.

Referring to the drawings, Figure 1 is a view, in perspective, of my invention. Fig. 2 is a plan view of the handle and blade of the shears with which the cutting-knife is connected. Fig. 3 represents different forms of grafting, which may be respectively done by modifications of the particular form of knife shown in the previous views.

The handles A may be of any desired form, secured together by a pivot, $a$, or otherwise, and provided with spring mechanism tending to maintain the same apart, so as to keep the blades open.

The drawings illustrate two band-springs, B, for this purpose; but, instead thereof, one band-spring may be used, one or more spiral springs, or other form of springs adapted to accomplish the same result.

The blades are made, one, C, having a flat bearing-surface, and the other, D, formed as the cutting-knife. Two forms of knives are shown in this instance—the one, $d$, adapted to make a coniform or wedge-shaped kerf, while the other one, $d'$, is adapted to bevel-cut both longitudinal sides of the stock or scion. In this manner the proper cuts can be made respectively in the stock and scion, so that the tongue of the one may fit into the V-shaped kerf of the other.

Instead of these particular forms of knives, I may make the blade with any other angular-shaped knife adapted to produce the desired form of grafting.

The scope of the invention is illustrated by the three different forms of grafting shown in Fig. 3 of the drawings, and which may be, respectively, done by suitably changing the form of the knife made in single piece with the cutting-blade. Thus, E represents the ordinary splice-graft; F, the whip-graft, and G the saddle-graft. Other forms of grafting may be done by making a knife or knives of shape corresponding thereto.

Instead of having two knives, there may be but one; or, in substitution for both knives on a single blade, there may be one knife on one blade, and the other knife on the opposite blade. In the latter case, the two knives would be located out of line, so that they would not interfere one with the operation of the other, and in such case each blade would have a flat working-face for a portion of the same, and also an angular-shaped knife.

The shears are made with the handle and main body of malleable iron, the blades being respectively cast with the two handles, or otherwise fastened, and then subjected to a process adapted to temper same and convert them into steel of the best quality.

Having fully described my invention, what I claim as new, and desire to secure by Letters Patent, is—

Grafting-shears consisting in the combination, with pivoted handles provided with spring mechanism tending to maintain same apart, of a pair of blades, one of which latter has a flat bearing-face, while the other has an angular-shaped knife or knives formed in same piece therewith, substantially as set forth.

In testimony that I claim the foregoing I have hereunto set my hand this 19th day of October, 1878.

WILLIAM HARRISON GRAY.

Witnesses:
W. H. H. TIFFANY,
C. M. KINGSBURY.